April 20, 1965     C. STAPEL     3,179,508
MOLD FOR SHAPING GLASS
Filed March 1, 1961     3 Sheets-Sheet 1

INVENTOR
CORNELIS STAPEL.
BY
AGENT

April 20, 1965  C. STAPEL  3,179,508
MOLD FOR SHAPING GLASS
Filed March 1, 1961  3 Sheets-Sheet 2

INVENTOR
CORNELIS STAPEL.
BY
AGENT 3,179,508
MOLD FOR SHAPING GLASS
Cornelis Stapel, Emmasingel, Eindhoven, Netherlands, assignor to North American Philips Company, Inc., New York, N.Y., a corporation of Delaware
Filed Mar. 1, 1961, Ser. No. 92,506
Claims priority, application Netherlands, Mar. 21, 1960, 249,671
5 Claims. (Cl. 65—292)

Devices for deforming a glass tube are known, wherein a portion of the tube to be deformed, which has been plasticized by heating, is introduced into a subdivided hollow mould having a neck aperture and where in the plasticized portion of the tube engages the wall of the cavity of the mould due to a pressure below atmospheric pressure being produced between the outer side of the plasticized portion of the tube and the inner wall of the mold. The above sometimes referred to as "suction method," is described in Swiss patent specification No. 235,257, filed March 16, 1945.

When a pressure below atmospheric pressure is produced between the plasticized portion of the tube and the wall of the cavity of the mold, the space between the inner side of the neck of the suction mold and the outer side of the tube gives rise to air flowing in through this space towards the cavity of the mold. Such an inward flow of air constitutes a great disadvantage in practice. As a result thereof, on the one hand, a stronger suction force is needed for deforming the plasticized portion of the tube than would be strictly necessary and, on the other hand, the leak effect causes the parts of the plasticized tube portion adjacent the neck aperture frequently to be deformed insufficiently. Responsible for this latter circumstance is the cooling effect of the air-leak upon the plasticized portion of the tube.

In order to limit the inward flow of air along the outer side of the tube at the neck of the mold, it has previously been suggested to make the leak gap as narrow as possible. However, if a plurality of tubes have to be deformed in succession with the aid of one suction form only, the tubes are required to be accurately sorted as to diameter, which is an expensive operation. It has also been suggested to close the space between the tube and the inner side of the neck of the suction mold by means of a sealing ring. However, this is a time-consuming and complicated operation at the comparatively high temperature prevailing at the inner side of the mold. As a result thereof, such rings are subject to considerable wear.

An object of the present invention is to provide a mold which efficaciously mitigates the disadvantage of the entrance of air to the cavity of the mold during deforming of the plasticized portion of the tube.

The device according to the invention is characterized in that at the neck aperture, by means of a supply of a gas at a pressure above atmospheric pressure, a flow of gas is maintained between the inner side of the neck of the mold and the outer wall of the tube, which flow of gas, as viewed from the cavity of the mold, is directed at least substantially to the exterior. The supply of the gas above atmospheric pressure, for example compressed air, is such that the gas flow is directed at least to the non-plasticized portion of the tube, the gas flow directed to the exterior having a velocity such that the ambient air cannot flow to the cavity of the mold. In contrast to the air current which, in the known device, is directed towards the cavity of the mold during deforming the plasticized portion of the tube, in the device according to the invention a flow of gas is produced through the same gap, which is directed to the exterior of the mold.

By means of a jet in combination with a mold, a pressure below atmospheric pressure is produced in at least that portion of the space between the wall of the neck of the mold and the outer side of the tube which is not traversed by the gas above atmospheric pressure. The value of the pressure below atmospheric pressure is also dependent upon the pressure of the gas supplied. The pressure below atmospheric pressure thus produced results in the advantage that the deformation of at least the plasticized portion of the tube surrounded by the neck of the mold may be considerably facilitated. It has also been found that tolerances in the diameter of at least the non-plasticized portion of the tube surrounded by the neck of the mold can have only a comparatively small influence upon the difference in pressure brought about by the said flow of gas.

In another embodiment according to the invention, that portion of the space between the inner wall of the neck of the mold and the outer side of the tube which is not traversed by the gas above atmospheric pressure communicates with the cavity of the mold by means of ducts provided in the mold, while the pressure below atmospheric pressure which prevails in the space between the cavity of the mold and the plasticized portion of the tube is produced solely by the gas flow maintained between the inner wall of the neck of the mold and the outer side of the tube. It is thus possible for the plasticized portion of the tube to be deformed solely with the aid of, for instance, compressed air. This is very important, for example, if in the manufacture of hollow glass objects with the use of a suction mold, one has not the disposal of vacuum sources.

Due to at least the non-plasticized portion of the tube, which is also surrounded by the inner wall of the neck of the mold, being dependent upon small tolerances in diameter to a lesser extent, the tube may successfully be rotated relative to the suction mold. When using a suction mold comprising, for example, two halves, it is thus possible to obtain so-called seamless objects. In this case, the passage between the inner wall of the neck of the mold and the outer side of at least the non-plasticized portion of the tube may be chosen so that, on the one hand, the risk of the tube being damaged by the inner wall of the neck of the mold is a minimum and, on the other hand, leakage of ambient air through this passage to the cavity of the mold is still inhibited. This is important more particularly for long tubes which are successively to be provided with a widened portion at their ends with the use of the same suction mold. Such tubes, during rotation relative to the mold, have a tendency of swinging at the neck aperture, resulting in a liberal play of the tube in the neck aperture of the mold being unavoidable. In another embodiment according to the invention, the gas above atmospheric pressure is heated in order to avoid any fissures (cracks) giving rise to breakage in the non-plasticized portion of the tube, which is naturally hot.

The plasticized portion of the tube to be deformed is usually situated at the end of a tube. However, the device according to the invention may also be used successfully if the portion of the tube to be deformed is situated at an area other than the end. Such is the case if a widened portion of an object to be manufactured is situated between two non-deformed aligned portions of the tube. In this case use is made of a mold having two opposing neck apertures.

In one particular embodiment, the means for maintaining the flow of gas in the neck aperture comprise a jet in the form of an annular channel which surrounds the neck aperture preferably concentrically and which may be connected to an adjustable supply of a gas above atmospheric pressure, the channel also being in free communication with the neck space of the mold through a gap extending conically to the neck aperture.

In another particular embodiment of a device according to the invention, the subdivided hollow mold is provided with a recess between the neck aperture and the cavity of the mold, which recess adjoins the neck aperture and the cavity respectively and has a cylindrical shape near the cavity of the mold and a likewise cylindrical shape near the neck aperture, which is widened with respect thereto, apertures for the suply of the gas above atmospheric presure being provided in the widened cylindrical portion of the wall.

The invention will now be described in detail, by way of example, with reference to the accompanying diagramatic drawings, in which:

FIGURES 5 to 8 show another embodiment, of which FIGURE 5 is a plan view, FIGURE 6 a sectional view along VI—VI, FIGURE 7 a sectional view along VII—VII and FIGURE 8 a sectional view along VIII—VIII of FIGURE 5.

Figure 1:
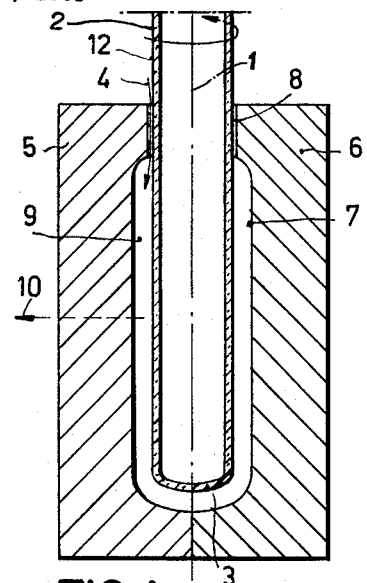
FIGURE 1 shows diagramamtically a suction mold and a tube positioned therein, which is to be deformed in part into a shape as shown in FIGURE 2, this by a known method and apparatus.
Figure 2:
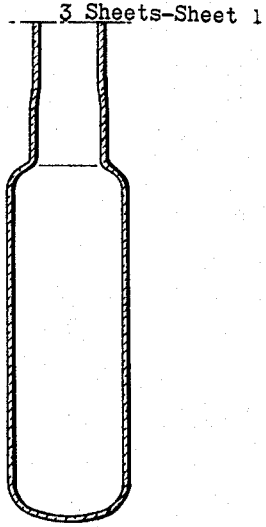

To deform a portion of a glass tube 2, closed at its lower end 3, into a hollow glass object as shown in FIGURE 2, use may be made of a suction mold comprising parts 5 and 6. In the closed condition (FIGURE 1), the mold parts 5 and 6 enclose a mold cavity 7 and a neck aperture 8. After the portion of the tube surrounded by the mold has been plasticized by heating, the suction mold is positioned around the plasticized portion of the tube (FIGURE 1). The tube 2 can rotate about its centre line 1 relative to the suction mold. The object shown in FIGURE 2 may be manufactured, for example, in that a pressure below atmospheric pressure relative to the ambient air in the cavity of the tube is produced in the space between the wall 7 of the cavity of the mold and the outer side of the plasticized portion of the tube. For this purpose, the space 9 communicates with a suction line through ducts provided in the mold (not shown). The suction is indicated diagrammatically by an arrow 10. Due to the difference in pressure produced, the plasticized portion of the tube will engage the wall of the cavity of the mold. During this process, ambient air at the neck aperture 8 will be drawn to the cavity of the mold through the cylindrical gap formed between the outer side 12 of the tube and the neck aperture 8, as indicated diagrammatically by an arrow 4.

Such entrance of air is objectionable to the deformation of the plasticized portion of the tube, since the suction force needed for deforming the plasticized portion of the tube is stronger than would be strictly necessary for such deformation. In addition, the tube portions adjacent the neck aperture are frequently deformed insufficiently.

Figure 3:
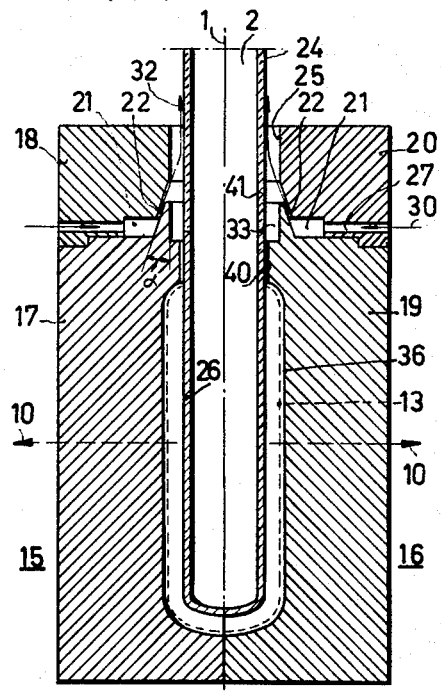
FIGURE 3 shows diagrammatically a divided mold according to the invention. The object manufactured with this suction mold is shown in FIGURE 4.
Figure 4:
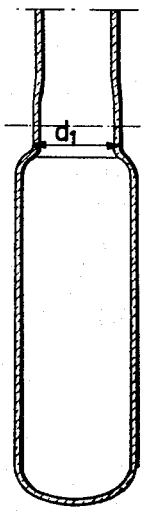

The sealing method shown in FIGURE 3 mitigates the said disadvantage. The mold comprising halves 15 and 16, by means of which the cross-hatched plasticized portion 26 of the tube may be deformed into a shape as shown in FIGURE 4, is built up so that the parts 17, 18, 19 and 20 enclose a chamber 21 surrounding coaxially the axis 1. The chamber 21 communicates through a conical gap defining a jet 22 with the space formed by the outer side 24 of the tube and the wall 25 of the neck aperture. The chamber 21 may be connected through ducts 27 to a supply 30 of compressed air.

When the mold halves 15 and 16 around the tube are closed and, subsequently, the compressed air is supplied, a flow of gas directed to the exterior, as indicated by an arrow 32, may be maintained at the neck aperture, the arrangement being such that the ambient air cannot flow freely to the cavity of the mold through the annular gap formed by the outer side 24 of the tube and the wall 40 of the narrowed neck portion. As a result of this gas flow, a pressure below atmospheric pressure will arise at 33 having a value dependent inter alia upon the pressure of the compressed air supplied, the dimensions of the jet 22 and the angle of inclination. Subsequently, in the space between the wall 36 of the cavity of the mold and the outer side of the plasticized portion of the tube, a pressure below atmospheric pressure is produced in similar manner as in FIGURE 1 by drawing off the air from this space. The plasticized portion of the tube may thus engage both the wall 40 and the wall 36 in a manner as indicated by 13 in dotted line in FIGURE 3. Due to the pressure below atmospheric pressure produced at 33 by the flow of gas, the shaping of the plasticized portion of the tube surrounded by the wall 40 is assisted in an efficaceous manner, thus ensuring that the plasticized portion of the tube also fully engages the wall portion 04. Consequently, the objects shown in FIGURE 4 exhibit a high accuracy of measure as to dimension $d_1$. It has been found that comparatively great tolerances in the diameters of both the plasticized tube portion 26 and the non-plasticized portion 41 are permissible if the pressure of the compressed air is maintained constant. The shaping action at the wall portion 40 will then always be substantially the same.

In order to prevent the flow of compressed air indicated by the arrow 32 from exerting a high cooling effect, giving rise to cracks in the glass, upon the tube portion 41 which is no doubt hot, the compressed air, prior to being supplied to the chamber 21, may be heated in a manner otherwise not shown in detail.

In the embodiment of a mold shown in FIGURES 5 to 8, the pressure below atmospheric pressure in the space between the cavity of the mold and the wall of the tube is produced solely due to a gas flow directed to the exterior as indicated by an arrow 75 being maintained between the inner wall of the neck of the mold and the outer side of the tube. This may be clarified as follows.

Figure 6:
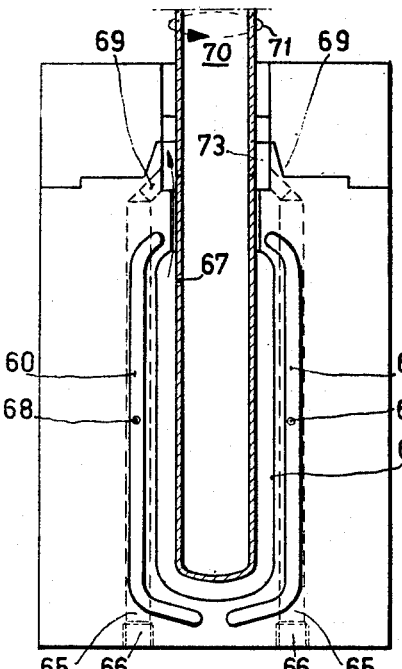
Figure 7:
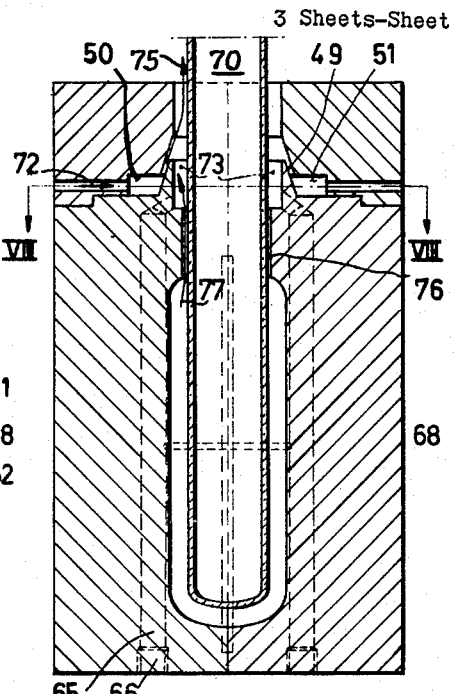
Figure 5:
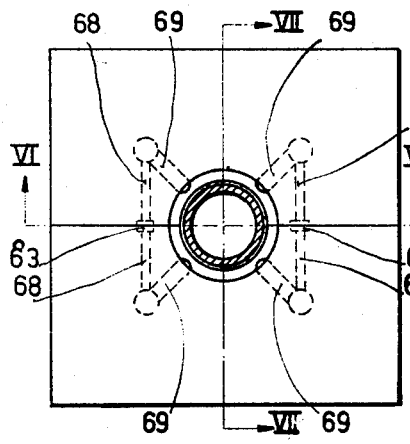
Figure 8:
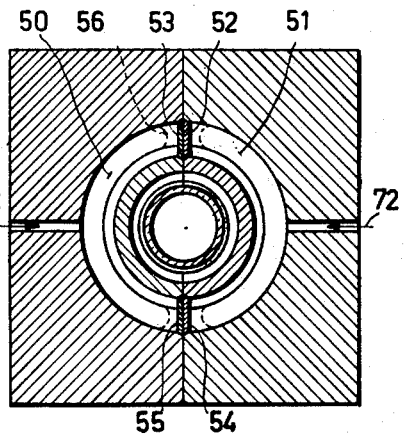

The mold is essentially approximately identical with the one shown in FIGURE 3. As before, the mold halves are built up so as to enclose, in their closed position, a compressed-air chamber with conical jet 49, surrounding co-axially the neck aperture (FIGURE 7). Due to the mold being divided, this co-axial space is closed at the separation surface of the mold by plates 52 to 55, resulting in separate chambers 50 and 51. As an alternative, the chambers 50 and 51 may be closed by making them terminate in a manner as indicated by 56 in FIGURE 8. The halves of the mold have shallow grooves 60 and 61 respectively, situated at a short distance from the boundary 62 of the cavity of the mold and at the division surface of the mold (FIGURE 6). In the closed position of the mold, the mold halves close a channel (63, 64) in FIGURE 5, formed by the said slots. The mold also has four bores 65 each containing a plug 66 at its lower end. In addition, two groups each of four communication channels 68 and 69 are provided in the mold.

Operating such a mold may be effected as follows. In a similar manner as previously described, the mold halves around a tube 70 are closed after a portion 67 of this tube has previously been plasticized by heating. To obtain seamless objects, the tube 70 is rotated relative to the suction mold in the sense indicated by 71. Subsequently, the chambers 50 and 51 are connected to a supply of compressed air (72 in FIGURES 7 and 8). The gas flow indicated by an arrow 75 produces, at 73, a pressure below atmospheric pressure in a similar manner as previously described, which pressure passes through ducts 69, 65 and 68 to prevail ultimately in recesses 60 and 61. Consequently, the air present between the tube and the wall of the cavity of the mold may be drawn off along the division surface of the mold situated between the grooves 60 and 61 and the cavity of the mold. A sucking action as indicated by arrow 77 now occurs for a short period. However, when the plasticized portion of the tube has engaged a wall portion 76, the plasticized portion of the tube surrounded by the cavity of the mold can be shaped further solely by the pressure below atmospheric pressure in the grooves 60 and 61 which passes through the ducts 68, 65 and 69.

Figure 9:
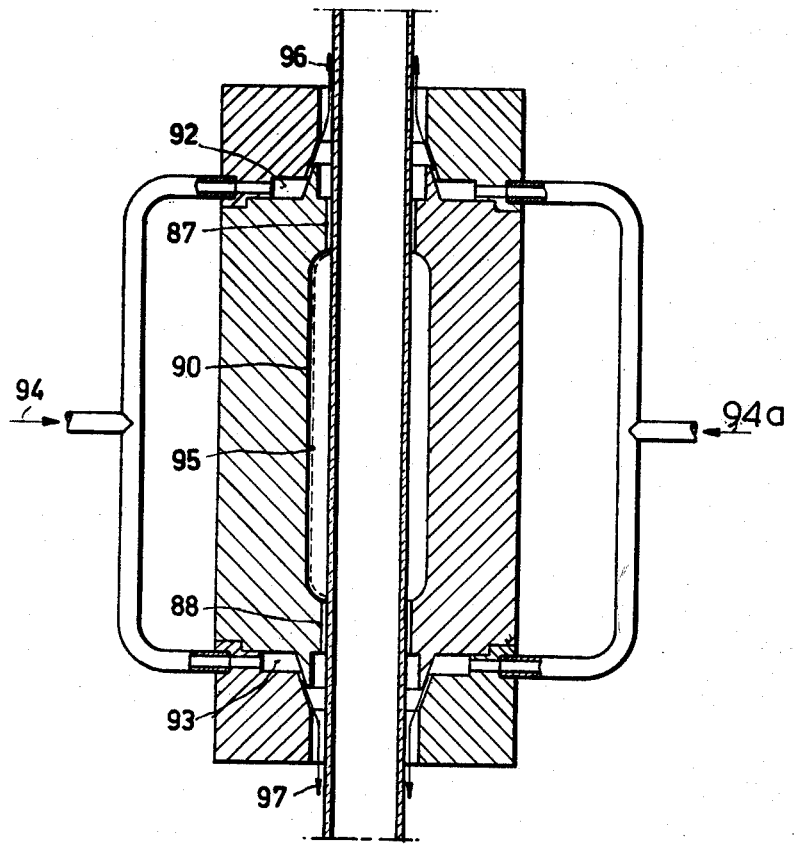
FIGURE 9 shows a composite mold having two opposing neck apertures.

FIGURE 9 shows an arrangement which permits deforming tubes so that the widened portion of the object ultimately obtained is not situated at the end of the tube. The mold has in this case two opposing neck apertures 87 and 88. The cavity of the mold is indicated by 90. In order to obtain satisfactory sealing of this mold against inflowing air, annular chambers 92 and 93 and conically-shaped jets are provided at the two neck apertures. The two chambers are connected to compressed-air supplies 94 and 95, respectively, in a manner otherwise shown diagrammatically. During deforming at least the plasticized tube portion surrounded by the cavity 90 of the mold into a shape as indicated by 95, a flow of compressed air, indicated by arrows 96 and 97, is maintained in this embodiment simultaneously at the upper and the lower ends.

What is claimed is:

1. Apparatus for deforming a glass tube having a plastic portion, comprising a mold having a cavity receiving said plastic portion and a neck portion opening into said cavity, jet means adjoining said neck portion for introducing and directing a gas under pressure outwardly of said mold through the opening of said neck portion for aspirating said cavity and sealing said cavity against the entry of ambient air.

2. Apparatus according to claim 1 in which said jet means for introducing and directing said gas comprises a channel opening into said neck portion at an inclination directed outwardly through said neck portion, and conduit means communicating said channel with the exterior of said mold whereby a gas under pressure is conducted to said channel.

3. Apparatus as claimed in claim 2 with the addition of a recess in the neck portion of said mold inwardly of the said channel.

4. Apparatus according to claim 2 wherein said neck portion of said mold comprises a first annulus of given diameter adjoining the cavity of a mold and defining said construction, and a radially enlarged annular recess adjoining said first annulus remote from said cavity, and said inclined channel opens into said enlarged annular recess spaced from the first annulus.

5. Apparatus comprising a mold for deforming a glass tube having a discrete area plasticized by heating, said mold having a mold cavity centrally thereof, a neck portion at opposite ends of said cavity, each said neck portion having an annular constriction adjoining said cavity and an annular recess adjoining said constriction remote from said cavity, an annular jet means opening into said recess spaced from said constriction, and means for connecting said annular jet means with a source of gas under pressure for evacuating said cavity by aspiration and sealing said cavity from the ambient atmosphere during evacuation of said cavity.

References Cited by the Examiner
UNITED STATES PATENTS

| | | | |
|---|---|---|---|
| 905,044 | 11/08 | Arbogast | 65—82 |
| 2,348,347 | 5/44 | Koob | 65—261 |
| 2,423,113 | 7/47 | Pfleghar | 65—277 |
| 2,467,000 | 4/49 | Samuelson | 65—263 |
| 2,495,253 | 1/50 | Hayes | 65—82 |
| 2,531,394 | 11/50 | Campbell | 65—292 |
| 2,693,667 | 11/54 | McLaughlin | 65—54 |
| 2,771,710 | 11/56 | Molinari et al. | 65—110 |
| 2,822,501 | 2/58 | Poulter | 65—363 |
| 3,015,911 | 1/62 | Payne | 65—356 |
| 3,091,104 | 5/63 | Morrill | 65—110 |

DONALL H. SYLVESTER, *Primary Examiner.*

UNITED STATES PATENT OFFICE
CERTIFICATE OF CORRECTION

Patent No. 3,179,508 April 20, 1965

Cornelis Stapel

It is hereby certified that error appears in the above numbered patent requiring correction and that the said Letters Patent should read as corrected below.

Column 4, line 22, for "04" read -- 40 --; column 6, lines 9 and 10, for "said construction" read -- said constriction --.

Signed and sealed this 30th day of November 1965.

(SEAL)
Attest:

ERNEST W. SWIDER
Attesting Officer

EDWARD J. BRENNER
Commissioner of Patents